Patented June 25, 1946

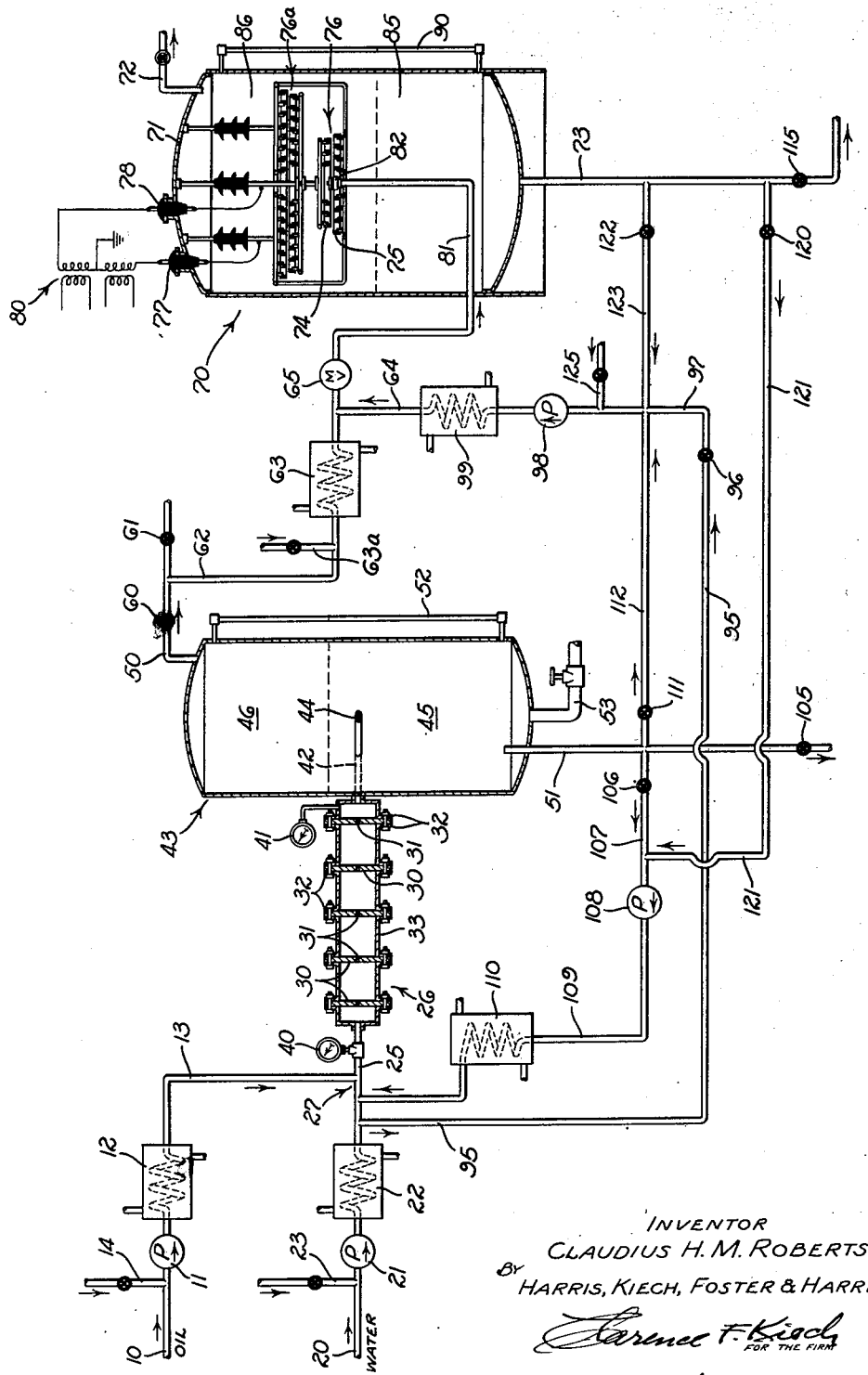

2,402,844

UNITED STATES PATENT OFFICE 2,402,844

METHOD FOR PURIFYING MINERAL OILS

Claudius H. M. Roberts, Palos Verdes Estates, Calif., assignor to Petrolite Corporation, Ltd., Wilmington, Del., a corporation of Delaware Application March 12, 1940, Serial No. 323,572

19 Claims. (Cl. 204—190)

This invention relates to a method for treating oils and, more particularly, to the formation and treatment of mixtures of oil and water for the general purpose of purifying the oil.

Oils, typically petroleum oils, frequently contain impurities of the type generally describable as water-dispersible. These impurities may be either molecularly or ionically dispersible in water, as in the case of water-soluble salts, or dispersible in water as solid particles, as in the case of particles of sand or silt having water-wettable or water-wet surfaces. In some instances, the impurities may originally be preferentially dispersible in oil, but if, in the practice of the present process, they become physically or chemically modified so as to be ultimately dispersible in the water employed, they are hereintermed "water-dispersible."

The removal of water-dispersible impurities is frequently of great importance, one instance being the removal of salt or oil field brine from crude petroleum prior to the distillation and/or cracking thereof. If the attempt is made to process a crude oil containing substantial quantities of salt or brine, serious corrosion and/or encrustation of the refinery equipment will result. The salts per se tend to form deposits on the walls of heat interchangers and high-temperature surfaces generally, and if permitted to form in the cracking equipment, these deposits are further augmented by extensive coke formation, which effect is apparently due to some form of catalysis by or deposition with the salts. Acids, particularly hydrochloric acid, may be originally present as a water-dispersible impurity (normally in oils from acidized wells), or may be formed by hydrolytic decomposition of the chloride salts at elevated temperatures. The presence of hydrochloric acid thus present or formed may lead to very severe corrosion. The presence of the above-mentioned and other water-dispersible impurities is generally objectionable from the standpoint of equipment maintenance and from other standpoints as well, including the quality of the overhead and residual petroleum fractions.

It is a general object of the present invention to provide a method for the removal of water-dispersible impurities from oil and, more particularly, for the removal of saline impurities from crude oil.

The removal of the water-dispersible impurities is essentially accomplished by effecting their transfer into an aqueous phase separable from the oil. The receptive aqueous phase is, in general, distinct from, and relatively fresh with respect to, such water as may be originally associated or connate with the oil, the quantity of connate water for the most part being relatively small, corresponding to that of pipe-line oils or dehydrated oils from which as much water or brine has been removed as is feasible by conventional dehydration practices.

The successful embodiment of this simple concept into a practicable process necessitates the overcoming of many difficulties. One such difficulty arises from the fact that the impurities are, for the most part, carried as minute suspensoids in the original oil. Crude petroleum, for example, may contain saline impurities dispersed throughout the oil as microscopic, highly stabilized droplets of brine, or, less frequently, as crystalline particles arising from the dehydration of such droplets. It is, accordingly, difficult to bring an additional aqueous phase into desired contact with these impurities.

This difficulty may be met by attempting a washing of the oil by dispersing the additional water as fine droplets throughout the oil so as to give ample opportunity for encounter between the added water and suspended impurities, as well as a large interfacial area for extraction of solutes from the oil. A synthetic emulsion thus prepared presents further difficulties, however, in that encounters between the dispersed particles do not necessarily, or even normally, result in their coalescence, and in that the synthetic emulsion may become stabilized to a degree that the separation of even the added water becomes difficult.

These latter difficulties may, in large part, be attributed to the presence in the oil of natural emulsifying agents of the type adapted to stabilize water-in-oil emulsions. These agents form a protective film around the original brine droplets or similar dispersoids, and may form more or less rapidly around the droplets of freshly added water. The presence of such films around one or more of the droplets concerned greatly reduces the chances of coalescence on contact, and also stabilizes the emulsion to such a degree that it cannot be separated by settling and similar processes.

Violent agitation may sometimes cause forcible encounters which will rupture the protective films, but, as a rule, such excessive agitation leads to the disruption and further dispersion of the droplets, thus forming a very fine emulsion which may be extremely difficult to resolve.

In U. S. Patent No. 2,182,145 to H. C. Eddy, an electrical purification process is disclosed which provides for the subjection of a specially-formed synthetic emulsion to a high-tension electric field, thus producing coalescence between the added droplets and original impurities by forces of electrical attraction, the coalescence proceeding to masses of sufficient size to be readily removed from the oil by gravitational methods, including settling. By this process, the above-described difficulties are overcome to a very large degree and a commercially practicable process for removal of impurities is provided.

It is an object of the present invention to provide an improved purification process for removing impurities from oils, particularly for the removal of saline impurities from crude oil.

It is an object of the present invention to provide a novel method of establishing extensive contact between water and oil containing water-dispersible impurities, and of maintaining such contact for a period sufficient for at least partial purification of the oil without forming a stabilized emulsion.

It is an object of the present invention to provide a process of the kind described in which contact is established during a phase relationship unsuited to the specific action of the natural emulsifying agents, whereby stabilization is avoided, and it is a further object to provide for the extraction of such emulsifying agents under said non-emulsifying conditions.

It is a further object of the present invention to provide a contact step of the kind described in combination with an electrical process, more particularly as a pre-treatment prior to electrical desalting, whereby oils normally regarded as difficultly treatable may be readily purified to any desired degree.

The above and other objects are attained in the present invention by a method including the step of forming what I term a "dynamic dispersion" of oil in water. I have discovered that under certain conditions, including proper adjustment of phase ratios and of the nature and degree of the agitation employed, the oil may be finely dispersed throughout the water and that, as soon as the dynamic effect of continued agitation is removed, the water-external dispersion becomes unstable, rapidly settling into a layer of clear water and a layer of oil, the latter normally enclosing a small amount of emulsified water. I have furthermore established that substantial transfer of water-dispersible impurities from the oil into the water takes place in such a dynamic dispersion, and that the material thus transferred may include objectionable emulsifying agents, which, in the water environment, may become converted into advantageous hydrophile agents antagonistic to water-in-oil emulsions. I have, furthermore, established that the oil or oil-continuous emulsion recovered by settling such a dynamic dispersion is highly amenable to further purification by contact with internally dispersed water, which may include the water emulsified therein as it is recovered from said settling and/or water subsequently dispersed therein, more particularly where such internally dispersed water is ultimately removed by the action of a coalescing electric field. I have further found that, by successive contact of the oil with an external phase of water and an internal phase of water respectively, even very difficultly treatable oils may be readily purified to an exceptionally high degree.

The above and other objects and aspects of the present invention will be further described with reference to the drawing which is schematically illustrative of apparatus and flow lines suitable for the practice of my invention.

Referring to the drawing, the oil to be treated is supplied to a pipe 10 leading to the suction of a pump 11. The discharge of the pump 11 is passed through a heat interchanger 12 where the oil is brought to an appropriate temperature, and from there the oil passes through a pipe 13 for admixture with water, as presently to be described. A valved inlet pipe 14 is provided on the suction side of pump 11 for the introduction into the oil of a modifying agent, such as an alkaline agent or other agent as hereinafter described, should this be desired. Water is supplied to a pipe 20 connected with the suction of a pump 21, the discharge of which passes through a heat interchanger 22 wherein the water is brought to suitable temperature. If desired, a modifying agent may be introduced into the water stream, suitably by means of a valved inlet pipe 23 on the suction side of the pump 21.

The water leaving the heat interchanger 22 is conducted by means of a pipe 25 into a mixing or agitating device 26. The oil stream passing through pipe 13 is commingled with the water stream in pipe 25 by injection of the oil into the water at a juncture point 27 ahead of the agitating device 26, whereby a commingled water-continuous stream is supplied to the agitating device. The proportion of water in this commingled stream is adjusted by means of appropriate control of pumps 11 and 21 to be in excess of that quantity required for the formation of a water-continuous dispersion under conditions of turbulent agitation.

The agitating or mixing device 26 may be any device providing adequate agitation or turbulence of the combined streams to effect the dispersal of the oil as fine particles or droplets throughout the water, and, if desired, may be a mixer of the mechanical or moving vane type. In the present embodiment, the desired agitation is obtained by passage through one or more orifices, the energy corresponding to the pressure drop across these orifices being converted into turbulent agitation of the two fluids. In the device shown, four discs 30, each having a centrally-disposed orifice 31, are assembled by means of flanges 32 in an enlarged section of pipe 33.

The passage of the mixed oil and water through the series of orifices thus provided results in the dispersion of the oil as fine droplets throughout the water. The degree of dispersion may be suitably controlled by adjustment of the pressure drop across the mixing device 26, as indicated by the pressure gauges 40 and 41, this drop being subject to control by selection of suitably-sized orifices 31 and adjustment of the rate of fluid flow therethrough, as by adjustment of the rate of pumping. The use of the spaced plurality of orifices not only provides increased dispersion of the oil and extent of interfacial area, but also serves to prolong the time of dynamic contact to a degree sufficient to permit the desired transfer of impurities to the aqueous phase.

The water-continuous dispersion formed in the mixing device 26 is brought by means of a pipe 42 into a closed separating tank 43, preferably maintained at superatmospheric pressure. The tank 43 is preferably placed close to the last orifice to insure that the discharge into the tank is an intimate oil-in-water dispersion, and to avoid subjecting the dispersion to prolonged passage through pipes in which it may be undesirably modified. It is frequently advantageous to introduce the incoming dispersion tangentially into the tank in order to set up a swirling motion favorable for rapid separation, and for this purpose the pipe 42 is brought in off-center from the tank 43 and toward the back thereof, as indicated by the dotted lines and elongated orifice 44. A body of water 45 collects in the lower portion of the tank, and a body of oil 46, which normally will contain some emulsified water, collects in the upper portion of the tank. The oil is withdrawn from the top of the tank by means of a pipe 50 and the water is withdrawn from near the bottom of the tank by means of a pipe 51. By controlling the rates of withdrawal to conform to production ratios, the interfacial level, as indicated in a sight glass 52, may be kept relatively constant and preferably above the point of introduction of the dispersion into the tank. A large diameter flushing pipe 53 is placed at the bottom of the tank to permit withdrawal of any accumulated silt, sand, and the like.

The rate of oil withdrawal is controllable by means of a valve 60. For some purposes, this oil may be regarded as a finished product and may be bled from the system at this point by means of a valve 61. In most instances, however, it is preferable to process this oil further, suitably by steps inducing separation of residual emulsified water, such as treatment with an emulsion-breaking chemical, hot settling, or, preferably, subjection to the action of a coalescing electric field. In most instances, this ultimate step of resolution is preferably preceded by the step of dispersing additional water into the oil to obtain an emulsion of augmented water content, whereby further removal of water-dispersible impurities may be obtained. In the embodiment shown in the drawing, provision is made for the dispersal of water into the oil removed from the separating tank, and for the subsequent subjection of the augmented emulsion thus formed to the action of a coalescing electric field.

In the practice of these latter steps, the oil is conducted from pipe 50 into a pipe 62 leading into a heat exchanger 63 where its temperature may be suitably altered. If desired, the oil may be modified at this point by the addition of a modifying agent, suitably by injection of the latter through a valved inlet pipe 63a.

Following its issuance from the heat interchanger 63, the oil may be commingled with a suitable proportion of relatively fresh water, i. e., water less concentrated in the undesirable impurities than the brine droplets in the oil, which water may be introduced through pipe 64 and the resulting mixture passed through a mixing valve 65 to obtain suitable dispersion of the water throughout the oil. The dispersion or emulsion thus obtained is passed into an electric treater 70 comprising a closed shell 71 provided with a valved draw-off line 72 at its upper end and a water draw-off line 73 at its lower end. Suspended by insulators from the top of shell 71 are superposed electrodes 74 and 75 which cooperate to form an intervening field space or treating space 76. Insulating bushings 77 and 78 positioned in the top surface of shell 71 permit the introduction of oppositely-charged leads to energize the electrodes 74 and 75, these leads being connected externally to any suitable source of high potential current, suitably a center-grounded alternating current transformer 80. An additional pair of electrodes may also be provided, as shown, to define an upper treating space 76a.

The emulsion formed in mixing valve 65 is brought into the interior of the electric treater 70 by means of a pipe 81 which rises centrally and vertically to a spring-loaded discharge valve 82 positioned between the electrodes 74 and 75 and adapted to discharge the emulsion radially outward in an essentially horizontal plane through the treating space 76.

The particles of water in the incoming emulsion are coalesced to relatively large masses in the treating space 76 and these masses settle downwardly to form a body of coalesced water 85, while the lighter relatively dry oil accumulates in the upper part of the treater 70 as a body of oil 86. The interface between these two bodies is best kept substantially below the lower electrode 75, and a sight glass 90, or other means, may be provided for the more exact ascertainment and control of the interfacial level.

The oil removed from the oil body 86 means of pipe 72 represents the final product of the present process and, relative to the incoming oil, it is substantially free from objectionable water-dispercible impurities, such as salt, brine, water-dispersible solids, and the like, which the process is most advantageously adapted to remove. The water content of this purified oil will range from about ½ to 1 or 2%, which is commensurate with the water contents of refinery charging stocks, pipe-line oils, etc., which for the most part constitute the impure stock which the process is designed to purify. It will thus be seen that the oil undergoes no substantial amount of dehydration in the practice of this process. In some instances, in the intermediate stages, such as the oil removed from settler 43, the water content may be substantially higher than that of the incoming oil. It is not intended to imply, however, that the connate brine or other droplets of aqueous impurities originally associated with the oil are not removed, but rather that their removal is accomplished for the most part by replacement with a corresponding amount of fresh water relatively free from such impurities.

If desired, the oil may be contacted, both internally and externally, by relatively fresh water which has not been previously used. The supply of such water to pipe 25 for the initial external contact has been previously described. A portion of water in the same pipe 25 may be diverted for use in the second or internal dispersing step, if desired, by conducting it from pipe 25 at a point ahead of the juncture 27, suitably by means of a pipe 95 and a valve 96 controlling the flow into a suction pipe 97 of a pump 98, the discharge of which is conducted through a heat interchanger 99 for a suitable modification of the temperature of the water prior to its injection into the oil stream by means of pipe 64, as previously described.

In general, it is highly advantageous to provide for the re-use or recycling of a portion of the water used in one or both steps, these advantages including the beneficial action derived from the presence of counter-emulsifying agents in the separated water, as described in great length hereinafter. Provision is made for such recycling as follows.

Water withdrawn from the separator 43 by means of pipe 51 may be bled from the system by means of a valve 105 to the extent that it is not desired for re-use. For recycling through the first step, the water in pipe 51 is passed through a valve 106 in a pipe 107 leading to the suction of a pump 108, the discharge of which is carried by means of a pipe 109 through a heat interchanger 110 into pipe 25 at a point ahead of mixer 26, and preferably ahead of the oil-water juncture 27. Water separated in the first step may also be used to excellent advantage for dispersal in the second step, and for this purpose the water in pipe 51 may be passed by means of a valve 111 into a pipe 112 leading to the suction pipe 97 of pump 98. If this water contains much insoluble material, it should be filtered before dispersal in the oil. A flow line filter (not shown) may be provided for this purpose.

The water separated from the second contacting step in electric treater or resolver 70 may, likewise, be recycled to advantage, either to the first or second mixing step. This water, as above-indicated, is withdrawn through pipe 73 and such portions of it as are not used for recycling may be bled from the system by means of a valve 115. The water in pipe 73 may be conveniently conducted to the first mixing step by withdrawal through a valve 120 into a pipe 121 leading to the suction pipe 107 of pump 108. For recycling to the second step, the water in pipe 73 may be conveniently withdrawn through a valve 122 opening into a pipe 123 leading into the suction pipe 97 of pump 98.

In case it is desired to separately modify the water fed by pump 98 into the second dispersing step, this may be readily done by addition of a suitable modifying agent to the suction of pump 98 by means of a valved inlet pipe 125.

The process as a whole works best if the temperatures of the oil and water throughout are maintained relatively high, for example, from 150° F. to 210° F., or even higher, and if all operations are conducted at a superatmospheric pressure sufficiently high to prevent separation of vapors. Thus, for example, the pressure in the electric treater 70 may be maintained at 20 to 30 lbs./sq. in. gauge, with pressure in up-stream equipment correspondingly higher, particularly the pressures ahead of mixing devices 26 and 65.

The proportions of water and oil supplied to the mixer 26 should be such that a water-continuous dispersion is formed in the subsequent agitation. This, in general, will require a quantity of water, the ratio of which to the quantity of oil is in excess of the ratio of the internal pressure of the oil to that of the water, or what is approximately equivalent, the ratio of the surface tension of the oil to that of the water. In general, this requirement is fulfilled when the system contains more than about 33–45% water.

I have found that, to obtain best results, a substantially greater quantity of water than that indicated by the above criteria should be used, suitably from about 2 to 4 volumes of water to 1 volume of oil. The best results are usually obtained when the mixture subjected to agitation contains about 75%, or somewhat more, water since this minimizes the possibility of forming additional water-in-oil emulsion in the system and assures formation of a substantially exclusive oil-in-water dispersion.

By thus employing relatively large proportions of water and by providing continued and vigorous agitation, I have found it possible to effect the transfer of water-dispersible impurities from the oil to the water, and I am, likewise, able to prevent the incorporation of any excessive percentage of water into the oil phase in the form of stable emulsified droplets. This process also operates without formation of stable oil-in-water emulsions, because the aqueous (external) phase contains either no emulsifying agents or a deficient concentration of such agents to overcome the natural tendency of the oily phase to stabilize oil-continuous emulsions.

The character and duration of the agitation will vary according to the character of the constituents and the degree of purification which it is desired to obtain, but, in general, the agitation should be sufficiently vigorous to disperse the oil as relatively fine droplets throughout the water, thereby presenting a large interfacial area across which transfer of impurities can occur, particularly in view of the relatively small diameter of the oil droplets, whereby most of the impurities suspended or dissolved in the oil are brought close to an oil-water interface. Another effect of the vigorous agitation which it is desirable to employ is the suppression of formation of water-in-oil emulsions, as evidenced by the relatively small proportion of emulsified water carried by the oil which separates on settling of the temporary dynamic dispersion. It is possible that this effect is primarily due to the fact that, since the oil is dispersed in small droplets throughout the water, it is not subjected to the shearing action required for dispersion of water into the oil and the internal and interfacial forces acting on the oil droplets are sufficient to minimize the intrusion of water. In most instances, the quantity of water associated with the oil separating from the dynamic dispersion step will be found not to exceed 5 or 10%, and, in some instances, may be as low as 3%, or somewhat lower. This, in general, is somewhat higher than the water content of refinery charging stocks which normally represent the raw, impure oil which it is the principal purpose of the present invention to treat. While there is thus no substantial dehydration of the oil processed in my step of dynamic dispersion, and usually an augmentation of water content, there will be a substitution of the process water for the original connate water, which substitution may proceed to a very substantial degree, thus effecting replacement of brine or other impure droplets with the process water which, in general, will be much less concentrated in the undesirable saline or other impurities, whereby at least a partial purification of the oil is effected. A particularly useful feature of this invention is its effect in removing oil-dispersed, water-dispersible, insoluble materials, such as "dirt," drilling mud, sand, gypsum, etc. from the oil. Such materials, if allowed to remain in the oil until processed by the conventional purification process of the Eddy patent, supra, often cause or stabilize the formation of refractive sludges, thereby restricting the duration of operation of his process, or forming objectionable deposits in the treater. In my process, these water-dispersible solids are removed in the water separated in tank 43, and are withdrawn through dump valve 53, thereby materially improving the operating characteristics of treater 70, as well as the time it can be kept on-stream.

The degree of agitation employed should not be so great as to produce very minute droplets of oil which would tend to form an homogenized dispersion of small particle size from which the oil would not be readily separable by settling or other gravitational methods of separation, such as centrifuging. It is an essential characteristic of the dynamic dispersions employed in the present process that they are unstable as soon as the dynamic effect of continued agitation is removed, and that, on passage into a quiescent settling zone, the dispersion formed in accordance with the present invention will rapidly separate into a body of separated water substantially free from oil and a body of oil containing a relatively small quantity of water in an emulsified or loosely dispersed form.

In order to maintain the oil in the desired highly comminuted state for a period sufficient to effect substantial extraction of water-dispersible impurities, emulsifying agents, and the like, it is frequently desirable to provide sustained agitation for an appreciable period before discharge of the dispersion into the separating zone. In the embodiment shown, this effect of sustained agitation is provided by a plurality of sequentially positioned orifice plates, five being shown in the drawing. The optimum length of the agitation period will differ from oil to oil and also with the degree of purification which it is desired to obtain in this step, and, accordingly, no exact period may be stated. With some oils which are readily treatable, passage through a single orifice or other dispersing device will be sufficient to give the desired degree of purification. In other instances, a substantially protracted period of agitation will be found desirable and, in such instances, I have frequently found it advantageous to provide mechanical means of agitation, suitably in the form of rotating vanes or propellers placed in an agitating vessel of substantial capacity and connected directly in the flow line.

As an example of the degree of agitation suitable for one typical oil, a total pressure drop of 75 lbs. was maintained across four orifice plates when a mixture comprising 1 volume of oil and 3 volumes of water was passed therethrough.

In most instances, the relatively fresh water admixed with the oil in the dynamic dispersion step is preferably constituted by a relatively large proportion of recycled water derived either from the separator 43 or the electric treater 70. I may employ relatively high recycle ratios to excellent advantage. For example, the water flowing through pipe 25 may comprise 9 volumes of recycle water to 1 volume of freshly added water. If desired, this recycle ratio may be periodically reduced when the concentration of impurities in the recycle water increases to an undesirable degree, although I have found that it is possible to obtain excellent results even when the salinity of the recycle water is an appreciable fraction, e. g., 20-30% of that of the connate brine.

By the use of recycle water in one or both dispersing steps I have found that I am able to substantially improve the separation of the dispersions and/or removal of impurities. I attribute this in large part to the presence of counter-emulsifying agents in the recycle water. Apparently, there is a transfer of some of the natural emulsifying agents originally present in the oil and there exercising a stabilizing action on water-in-oil emulsions into the aqueous phase where the specific character of the emulsifying agent is reversed, whereby the oil is denuded of much of its objectionable emulsifying agents and the water enriched in counter-emulsifying agents antagonistic to oil-continuous emulsions. In some instances, this effect may be greatly increased by employing water which is slightly alkaline, as discussed at greater length below, whereby a portion at least of the oil-soluble organic acids in the oil are converted into water-soluble soaps.

With regard to the proportions of oil and water employed in the second dispersing step wherein an oil-continuous emulsion is formed, it is usually advisable to prepare an emulsion containing from 5-30% water, and preferably from 10-20%. The amount of water added through pipe 64 should take into cognizance the amount of water naturally present in the oil flowing in line 62 in order that the desired total water content of the synthetic oil-continuous emulsion be obtained. As in the first dispersing step, the relatively fresh water employed in the second dispersing step may be very advantageously constituted, in part, by previously-used water derived either from the separator 43 or the electric treater 70 in order to obtain the benefits of the counter-emulsifying agents present in these waters. If the recycle water employed contains appreciable concentrations of dispersed solids derived from previous contact with impure oil, it should be suitably filtered or otherwise clarified before re-use. The oil-continuous emulsion thus formed will be found to be very amenable to various types of resolving treatments, particularly inasmuch as the oil, by virtue of the dynamic dispersion treatment, is substantially reduced in concentration in emulsifying agents, particles of insoluble solids, and other water-dispersible impurities which normally act to stabilize an oil-continuous emulsion and make its resolution difficult and/or lead to the concomitant production of sludge during such resolving treatment. I have found that, by operating with an oil previously processed by the dynamic dispersion step and employing additional water derived in part from one of the separatory steps, I am able to electrically treat oils and reduce their final salt content to an extremely low value in instances where the direct electrical purification of such oils is impracticable due to their inherent tendency to form sludge, or due to their exceptionally high content in water-dispersible impurities which cannot be satisfactorily removed by a single-step electric treatment.

The recycle ratios employed in dispersing water in the oil in the final step will usually be somewhat lower than those employed in the first step since it is desired that the water associated with the ultimately-produced oil be relatively free from saline or other impurities, but, in many instances, I have found that recycle ratios as high as 1 to 1 or 2 to 1, or even higher relative to the amount of fresh water supplied through pipe 95, may be advantageously employed.

If desired, the oil or water, or both, may be modified by the addition of suitable modifying agents at various points in the system, typically by their introduction through the valved inlet pipes 14, 23, 63a, and 125. Such modifying agents, typically those added to the water stream through the valved inlet pipe 23, may comprise emulsifying agents adapted to stabilize oil-in-water emulsions. Thus, in order, in the first step of the process, to increase the dispersibility of the oil in the extraction water and to minimize emulsification of some of the extraction water in the oil, it may be desirable to add to that water a small amount of a water-dispersible agent of the type adapted to form an oil-in-water emulsion. Among agents suitable for such addition may be mentioned glue, gelatin, agar, water-soluble detergents of the sulphonated higher alcohol type and, in general, any of the well-known emulsifying agents capable of forming oil-in-water emulsions. I may also add water softening agents, including alkaline material such as caustic alkali, soda ash, or soaps. The quantities of the agents thus employed should be insufficient to completely counteract the effects of the naturally-occurring emulsifying agents in the oil in order that the oil-in-water dispersions formed shall be temporary dynamic dispersions rather than permanent oil-in-water emulsions. While the effects of natural emulsifying agents are thus weakened, they are left dominant, and the oil phase which separates from the dynamic dispersion will accordingly normally contain several per cent of water emulsified therein.

When used primarily for the removal of impurities which are initially water-dispersible, such as saline impurities including connate brine, the process as a whole represents a very highly advantageous combination of steps which mutually influence each other to produce the desired end. As indicated above, one of the primary objects of the process is to remove impurities which are suspended or dissolved in an oil containing emulsifying agents stabilizing oil-continuous emulsions, or otherwise inherently disposed to produce stable oil-continuous emulsions with water. When the attempt is made to remove water-dispersible impurities from such an oil by a process in which the added water is present solely as an internally-dispersed phase, the presence of these objectionable emulsifying agents interferes with the ready and efficient resolution of such an emulsion. On the other hand, by providing for the substantial extraction of impurities, including emulsifying agents, prior to the formation of the oil-continuous emulsion, the final step of contacting and removing an internal phase of water may be very readily carried out. It will be noted that the initial treatment of the oil in the dynamically-dispersed condition is carried out under conditions in which the phase relationship is opposite to that favored by the natural emulsifying agents, whereby these agents and other impurities may be readily removed without giving rise to the formation of recalcitrant emulsions. On the other hand, the purification obtained during the dynamic dispersion step depends largely on the very great interfacial area presented for extraction, but, normally, this will not suffice to produce an adequately purified oil even though the purification thereby obtained is substantial. Accordingly, the combination of the preliminary treatment of the oil by a dynamic dispersion step, followed by an internal treatment more particularly in conjunction with the use of an electric field for the forcible coalescence and removal of the remaining impurities, provides a process by which oils not susceptible to other types of purification processes may be readily and efficiently purified to any desired degree.

In any type of operation, it will frequently be found advantageous to maintain the pH of the water issuing from both the separator 43 and the electric treater 70 slightly alkaline, for example, within the pH range of 7 to 9. An alkali, suitably caustic soda, soda ash, or potash, may be conveniently added to the initial water stream, as through the valved inlet pipe 23, and also directly to the water going to the second step, as through the valved inlet pipe 125, the quantities thus added, of course, being proportioned to the quantity of water flowing through the pipes receiving this addition. In some instances, I have found it advantageous to add the alkali directly to the oil, suitably through the valved inlet pipe 14 or the valved inlet pipe 63a. The alkali thus added to the oil may suitably comprise various concentrated caustic preparations, such as a concentrated solution of caustic soda in water or alcohol, or an inherently oil-soluble alkali, such as strong organic amines, the alkali alcoholates, etc., may be very advantageously used for this purpose. In many instances, the alkali may be profitably used in conjunction with other agents, such as those described above, typically emulsifying agents adapted to stabilize oil-in-water emulsions and the like.

While the process has been particularly exemplified by a discussion of its application to the purification of petroleum and, more particularly, the desalting of crude oils, it will be obvious that its applications are not limited to such specific uses. For example, it may be advantageously employed for the removal of acidic components from crude, refined, or partially refined oils and/or distillates, as well as for removal of oil-dispersed, water-dispersible insoluble solids from oils.

Various modifications and alterations of the described process and apparatus can be made and practiced without departing from the essence of my invention as defined by the scope of the appended claims.

I claim as my invention:

1. A process for removing water-dispersible impurities from an impure mineral oil containing same, said oil containing no more than a few per cent of water, comprising: dispersing the impure oil in an excess of relatively fresh water, the degree of dispersion being adjusted to obtain a water-continuous mixture of water and oil which will separate readily unless maintained by agitation into an oil-continuous phase and an aqueous phase substantially free from oil; separating said mixture to obtain an aqueous phase containing some of said impurities and an oil-continuous phase at least partially freed from said impurities but containing at least as much water as said impure oil; and dispersing further quantities of impure oil in relatively fresh water constituted in part by said aqueous phase.

2. A process for removing water-dispersible impurities from an impure mineral oil containing same, said oil containing no more than a few per cent of water, comprising: dispersing the impure oil in an excess of relatively fresh water, the degree of dispersion being adjusted to obtain a water-continuous mixture of water and oil which is substantially spontaneously separable unless maintained by agitation into an oil-continuous phase and an aqueous phase substantially free from oil; separating said mixture to obtain a separated aqueous phase containing some of the impurities and an oil-continuous phase at least partially freed from said impurities but containing at least as much water as said impure oil; separately recovering said oil-continuous phase; dispersing relatively fresh water therein to form an oil-continuous dispersion; and resolving said dispersion to obtain a body of purified oil relatively free from water and a body of separated aqueous phase containing additional water-dispersible impurities.

3. A process as in claim 2, in which the water dispersed in the oil-continuous phase is derived in part from at least one of said separated aqueous phases.

4. A process for removing water-dispersible impurities from an impure mineral oil containing same, said oil containing no more than a few per cent of water, comprising: contacting said oil with an external phase of relatively fresh water by dispersing it in said water as droplets to form a substantially-spontaneously-separable oil-continuous dispersion; coalescing said oil droplets to form a partially purified body of oil-continuous material; contacting the partially purified oil-continuous material with an internal phase of dispersed relatively fresh water by dispersing relatively fresh water into said partially purified oil-continuous material to form a dispersed phase therein; and coalescing and removing this last-named dispersed phase to obtain a purified oil.

5. A process for removing water-dispersible impurities from a mineral oil containing same, said oil containing not more than a few per cent of water, which comprises: mixing the oil with at least double its volume of relatively fresh water in a zone of turbulent agitation; adjusting the degree of said agitation to produce a dispersion of oil in water which is substantially spontaneously separable in the absence of said agitation into an aqueous phase containing impurities extracted from the oil and an oil-continuous phase containing a proportion of emulsified water not substantially less than that originally associated with the oil; separating said dispersion into said aqueous and oil-continuous phases by maintaining it in a zone of relative quiescence; and withdrawing and further purifying said oil-continuous phase by steps including the step of coalescing and removing therefrom additional quantities of disperse aqueous phase, the removal of said disperse phase being facilitated by the absence of impurities previously extracted from the oil.

6. A process as in claim 5, in which a portion of the separated aqueous phase is recycled from the quiescent zone to the relatively fresh water supplied to the zone of turbulent agitation for admixture with further impure oil.

7. A process as in claim 5, in which the further purifying steps include dispersal of additional water into the oil-continuous phase and subjection thereof to the coalescing action of a high-tension electric field.

8. A process as in claim 5, in which the dispersion is formed and separated at elevated temperatures and under superatmospheric pressures.

9. A process for purifying mineral oils containing no more than a few per cent of water to remove water-dispersible impurities comprising emulsifying agents, which comprises the steps of: dispersing the impure oil in an excess of relatively fresh water by agitation of such character as to produce a temporary water-continuous dispersion existing as such only because of and during continued agitation, said impure oil being dispersed in the relatively fresh water in the form of relatively small droplets to present a large interfacial area across which transfer of the impurities comprising said emulsifying agents can take place from the impure oil to the relatively fresh water; separating said dispersion by gravitational action into a body of water containing impurities removed from the oil and a body of partially-purified oil-continuous emulsion containing an amount of water no less than the water content of the impure oil; separately recovering said partially-purified emulsion; and electrically resolving said partially-purified emulsion by subjection thereof to the coalescing action of a high-voltage electric field to coalesce and separate the dispersed water from the oil and produce a relatively dry purified oil.

10. A process as in claim 9, in which additional relatively fresh water is dispersed in the partially-purified oil-continuous emulsion prior to the step of resolution.

11. A non-dehydration process for removing water-dispersible impurities from an impure mineral oil containing not more than a few per cent of water, said oil containing small dispersed brine droplets with which are associated at least a portion of the impurities to be removed and said oil containing emulsifying agents, which process includes the steps of: mixing with said oil more than an equal volume of relatively fresh water while employing sufficient relatively fresh water to form a water-continuous dispersion and while employing a mixing action of such character and a sufficient quantity of said relatively fresh water to substantially suppress the formation of water-in-oil emulsions and disperse said oil in the form of relatively fine droplets throughout the water to present a large interfacial area across which transfer of impurities can occur, said mixing being of such character as to produce a dispersion which will separate readily and substantially spontaneously into bodies of oil and water unless maintained by agitation; delivering said water-continuous dispersion to a separating zone; and separating said dispersion gravitationally in said separating zone to form a body of water now containing water-dispersible impurities from the oil and a body of oil containing an amount of water which is not less than the water content of said impure oil.

12. A non-dehydration process for removing water-dispersible impurities from an impure mineral oil containing not more than a few per cent of water, said oil containing small dispersed brine droplets with which are associated at least a portion of the impurities to be removed and said oil containing emulsifying agents, which process includes the steps of: mixing with said oil more than an equal volume of relatively fresh water while employing sufficient relatively fresh water to form a water-continuous dispersion and while employing a mixing action of such character and a sufficient quantity of said relatively fresh water to disperse said oil in the form of relatively fine droplets throughout the water to present a large interfacial area across which transfer of impurities can occur, said mixing being of such character as to produce a dispersion which will separate readily into a body of oil and a body of water unless maintained by agitation; delivering said water-continuous dispersion to a separating zone; separating said dispersion gravitationally in said separating zone to form a body of water now containing some of the water-dispersible impurities from the oil and a body of oil containing an amount of water which is not less than the water content of said impure oil, the separated oil containing less of said emulsifying agents than said impure oil and containing residual water droplets and water-dispersible impurities; dispersing relatively fresh water into said oil to form droplets of said relatively fresh water coexisting with residual water droplets remaining in said separated oil; subjecting this dispersion to the action of an electric field of sufficient intensity to coalesce the dispersed water and associate residual water-dispersible impurities therewith; and separating the coalesced water now containing in large measure the residual water-dispersible impurities to produce a purified oil containing no more than a few per cent of water.

13. A non-dehydration process for removing water-dispersible impurities from an impure mineral oil containing not more than a few per cent of water, which process includes the steps of: pumping a stream of relatively fresh water along a passage closed from the atmosphere; pumping a stream of impure oil into said stream of water moving along said passage, while controlling the relative rates of pumping in such manner that the volume of relatively fresh water is greater than the volume of impure oil; mixing by agitation the resulting combined stream comprising relatively fresh water and impure oil in such manner as to form a temparary water-continuous dispersion comprising a continuous phase of relatively fresh water in which the impure oil is dispersed in small droplets to present a large interfacial area across which transfer of impurities can take place from the impure oil to the relatively fresh water, said mixing being of such character that the resulting water-continuous dispersion will rapidly separate into a body of oil and a body of water in the absence of said agitation; and continuously delivering a stream of said temporary water-continuous dispersion to a separating zone and separating same therein to form separated bodies of oil and water, said separated body of water containing the impurities transferred to said water across the oil-water interfaces of said water-continuous dispersion and said body of oil comprising a partially purified oil, said mixing and separating steps being so controlled that said body of separated oil contains an amount of residual water no less than the amount of water in said impure oil.

14. A process as defined in claim 13, in which said mixing is performed and said agitation is effected in sequential steps by advancing said combined stream in sequence through a plurality of agitation zones disposed between said separating zone and the junction of said streams of impure oil and relatively fresh water, and in which these streams are pumped together at superatmospheric pressure sufficiently high to advance said combined stream through said restricted orifices and to said separating zone and sufficient to maintain a superatmospheric pressure in said separating zone.

15. A process for removing water-dispersible impurities contained in an impure mineral oil, said impure oil containing emulsifying agents of the type tending to stabilize emulsions of the water-in-oil type and containing no more than a few per cent of water, which process includes the steps of: mixing said impure oil with a larger volume of relatively fresh water while employing such amount of relatively fresh water and such character of mixing as will form a temporary water-continuous dispersion existing as such only because of and during continued agitation and which will separate rapidly into a body of separated oil and a body of separated water in the absence of such agitation, said impure oil being dispersed throughout the relatively fresh water by said mixing in the form of relatively small oil droplets to present a large interfacial area across which transfer of impurities comprising said emulsifying agents can take place; gravitationally separating said temporary water-continuous dispersion into said separated bodies of oil and water, said separated body of oil comprising a partially purified oil and said body of separated water containing the impurities comprising emulsifying agents removed from the impure oil, said mixing and separating steps being of such nature that the partially purified oil contains a total amount of water no less than the amount of water in said impure oil and said partially purified oil being more susceptible to subsequent resolution because of such removal of impurities comprising said emulsifying agents; and subsequently resolving the partially purified oil into a further purified oil and a body of water by coalescing the dispersed water of said partially purified oil and separating same to remove further impurities from said partially purified oil, such coalescence being facilitated by the absence of emulsifying agents removed from the oil by said mixing and separating steps.

16. A process for desalting those salty pipe-line oils unsuited for direct desalting by emulsifying relatively fresh water therein and resolving the emulsion and which oils contain emulsifying agents of such nature and in such amount as to stabilize the droplets of relatively fresh water to such extent as to result in the appearance of recalcitrant sludges when resolving the emulsion, which process includes the steps of: successively contacting such salty oil externally and internally with relatively fresh water by first mixing the salty oil with a larger volume of relatively fresh water while employing such amount of the relatively fresh water and such agitation in said mixing as will form a temporary water-continuous dispersion existing as such only because of and during continued agitation, then settling this temporary water-continuous dispersion to collect the water now containing a substantial amount of the emulsifying agents of the salty oil and to collect the dispersed droplets of oil as a body of oil containing substantially less of said emulsifying agents than said salty oil and containing no less water than the salty oil, and then dispersing relatively fresh water into the collected oil to form an oil-continuous emulsion less stable than would be a similar emulsion formed by dispersing the relatively fresh water directly into the incoming salty oil; and then resolving this less-stable oil-continuous emulsion substantially completely into a body of salty water and a body of oil.

17. A process for desalting those salty pipe-line oils unsuited for direct desalting by emulsifying relatively fresh water therein and resolving the emulsion and which oils contain emulsifying agents of such nature and in such amount as to stabilize the droplets of relatively fresh water to such extent as to result in the appearance of recalcitrant sludges when resolving the emulsion, which process includes the steps of: successively contacting such salty oil externally and internally with relatively fresh water by first dispersing the salty oil as readily-separable droplets in an external phase of relatively fresh water to facilitate transfer of emulsifying agents from the salty oil to the external phase of relatively fresh water, then collecting the dispersed droplets of oil as a body of oil containing substantially less of said emulsifying agents than said salty oil, and then dispersing relatively fresh water into the collected oil to form an oil-continuous emulsion less stable than would be a similar emulsion formed by dispersing the relatively fresh water directly into the incoming salty oil; and then resolving this less-stable oil-continuous emulsion substantially completely into a body of salty water and a body of oil.

18. A process as in claim 2, in which the relatively fresh water employed in at least one of said dispersing steps contains in part a portion of the separated aqueous phase produced by one of said coalescing steps.

19. A desalting process as defined in claim 16, in which said less-stable oil-continuous emulsion is resolved by subjecting same to the action of a high-voltage coalescing electric field and to a gravitational separating action to produce said body of salty water and said body of oil.

CLAUDIUS H. M. ROBERTS.

Certificate of Correction

Patent No. 2,402,844. June 25, 1946.

CLAUDIUS H. M. ROBERTS

It is hereby certified that errors appear in the printed specification of the above numbered patent requiring correction as follows: Column 5, line 51, after "valved" insert *oil*; column 6, line 9, after the numeral "86" insert *by*; column 15, lines 31 and 32, claim 14, for "restricted orifices" read *agitation zones*; and that the said Letters Patent should be read with these corrections therein that the same may conform to the record of the case in the Patent Office.

Signed and sealed this 12th day of November, A. D. 1946.

[SEAL]

LESLIE FRAZER,
*First Assistant Commissioner of Patents.*